US005515764A

United States Patent [19]

Rosen

[11] Patent Number: 5,515,764

[45] Date of Patent: May 14, 1996

[54] HARMONIC METRONOME

[76] Inventor: Daniel Rosen, P.O. Box 2310, Stateline, Nev. 89449

[21] Appl. No.: 366,611

[22] Filed: Dec. 30, 1994

[51] Int. Cl.[6] .......... G09B 15/00

[52] U.S. Cl. .......... 84/484; 84/DIG. 12; 84/652

[58] Field of Search .......... 84/470 R, 484, 84/DIG. 12, 636, 652, 668

[56] References Cited

U.S. PATENT DOCUMENTS

| | | | |
|---|---|---|---|
| 3,724,203 | 4/1973 | Wittner | 58/130 R |
| 3,818,693 | 6/1974 | Allard | 58/130 E |
| 4,014,167 | 3/1977 | Hasegawa et al. | 58/130 E |
| 4,018,131 | 4/1977 | Cannon | 84/484 |
| 4,090,355 | 5/1978 | Morohoshi | 58/130 E |
| 4,193,257 | 3/1980 | Watkins | 84/484 |
| 4,204,400 | 5/1980 | Morohoshi et al. | 84/484 |
| 4,733,593 | 3/1988 | Rothbart | 84/484 |
| 4,759,253 | 7/1988 | Harie et al. | 34/484 |
| 4,974,483 | 12/1990 | Luzzattto | 84/484 |
| 5,214,228 | 5/1993 | Hoiles et al. | 84/470 R |

*Primary Examiner*—Patrick J. Stanzione

[57] ABSTRACT

An electronic metronome device producing precisely timed and tuned rhythms and pitches that are pre-programmed to correspond to specific scales or modes, arpeggios, chords, and etudes. A combination of microprocessor and user interface (34, 30, 28, and 26) stores these musical exercises and retrieves them from an electronic memory (36), inputs them to a signal processor (42) for amplification and modification, and outputs (40) them to speakers (12), optical displays (24), audio outputs (18), etc. A volume control 20 and balance control 22 modify the audio signal coming from the speakers 12. The components, enabled either by an internal (battery) or external (plug) power source (44), are housed in a light and durable case for easy portability and user control.

8 Claims, 3 Drawing Sheets

HARMONIC METRONOME

BACKGROUND

1. Field of Invention

The present invention relates to metronomes, and more specifically to electronic metronomes.

2. Description of Prior Art

Metronomes have been used by musicians since the early nineteenth century. In musical education and practice (as in related arts such as dance), metronomes are rulers of measurement. They measure and control the rhythmic element of music.

Of the two fundamental elements of music, however, the time element, referred to as rhythm, is only one. The other is pitch, which provides the melodic or harmonic element. The two elements together, rhythm and pitch, provide the basis for all types of music.

Until now, the metronome has been unable to do for the practice of pitch what it has done for the practice of rhythm. Previously, a well-tuned piano (or other similarly tuned instrument) has been the only available ruler of measurement for pitch. To achieve perfect control over the harmonic element of music, the musician must constantly refer to such an instrument. This task has never been automated.

Conventional metronomes are mechanical devices having timing mechanisms which resemble that of an inverted pendulum clock. Such a device is generally disclosed in U.S. Pat. No 3,724,203 (Wittner, Pyramidal Metronome, 1973).

Electronic circuitry made possible the positive elimination of the mechanical pendulum apparatus, and also expanded the versatility of metronomes. For example, it is true that mechanical metronomes have long been capable of distinguishing between rhythmic beats, for the purpose of indicating not only pulse (as with the original metronomes), but also meter. In other words, by creating one strong (heavily weighted or loud) beat, followed by two weak (lightly weighted or soft) beats, the metronome produces a typical triple or "waltz" meter. By creating one strong beat, and one or three weak beats, the metronome produces a typical duple or "march" meter. Such a metronome is disclosed in U.S. Pat. No. 4,759,253 (Härie, Metronome, 1988). In this area, however, electronic metronomes have clearly established their superiority. U.S. Pat. No. 4,018,131 (Electronic Metronome, 1977) discloses an electronic metronome capable of providing audibly distinct subdivisions and cross rhythms. U.S. Pat. No. 4,974,483 (Luzzatto, Metronome device, 1990) is similarly capable of representing metrical relationships by producing audible distinctions between strong and weak beats.

It is noteworthy that the author of this last-mentioned patent states explicitly that, "preferably, said directly perceivable signals comprise pitchless acoustic signals" and "the overall signal . . . is not perceived by the musically trained human ear as a definite note, but rather as a 'noise' with which the ear does not associate a specific pitch." It is a fact that if a metronome produces randomly pitched rhythmic pulses, they can be a distraction to the musician, since these pitches often clash harmonically with the pitches indicated in the music. This fact has prevented all prior metronomes from entering into the realm of pitch, since none of them are capable of producing pre-programmed sequences of pitch that correspond to specific musical exercises.

Electronic circuitry has led to other innovations in various electronic metronome patents. Metronomes incorporating digital displays of tempo, for example, and which produce an audible and even visual indication of beats are available. Visual outputs are provided in the devices disclosed in U.S. Pat. Nos. 4,014,167 (Electronic Metronome, 1977) and 4,193,257 (Programmable Metronome, 1980). In the former patent, a metronome is disclosed which is capable of providing audible and visual display of strong and weak beats and their combinations. In the latter patent, upbeat and downbeat visual indications are produced, as well as an audible output which provides emphasis of downbeat. A digital readout of the selected tempo is also displayed.

U.S. Pat. Nos. 4,090,355 (Electronic Metronome, 1978) and 4,204,400 (Electronic Metronome, 1980) disclose additional electronic metronomes having distinct downbeat and upbeat displays which vary, for example, by color and duration.

U.S. Pat. No. 3,818,693 (Electronic Metronome, 1974) discloses a metronome wherein the beat pattern is intended to duplicate the movement patterns of a conductor's baton. The face of the metronome includes four light displays arranged in a quarter-hour clock pattern.

U.S. Pat. No. 4,974,483 (Luzzatto, Metronome device, 1990) discloses a programmable device which produces metronomic sequences of rhythmic beats corresponding to the rhythmic component of specific pieces of music, especially more recent music composed of constantly varying tempos and meters.

U.S. Pat. No. 5,214,228 (Hoiles, Electronic Metronome 1993), the most recently granted metronome patent, discloses a device which provides many of the most desirable characteristics: an authentic tick-tock audible output, a digital display, and selectable visual beat patterns coupled with a high accuracy time base.

This last state-of-the art metronome, however, like all its predecessors, lacks a means for measuring and regulating the production of musical pitches in metronomic coordination with a rhythmic output.

OBJECTS AND ADVANTAGES

The harmonic metronome eliminates this fundamental limitation of the traditional metronome. It unites, in one invention, the simultaneous and dual purposes of providing measurement and regulation for rhythm and pitch. Only the harmonic metronome has applied electronic circuitry to the conventional idea of the metronome so as to create such a comprehensive practice tool. The harmonic metronome is, therefore, a revolutionary instrument for which there are no true precedents.

As may be appreciated, the harmonic metronome answers to an age-old need in musical practice and education, a need which until now had only been partially answered. It fully automates the musical measurement of the two fundamental elements of music. The conventional metronome measures rhythm. The harmonic metronome measures rhythm and pitch. Thus, it is a very significant stage in the development of the metronome.

The harmonic metronome retains all of the conventional advantages of the traditional metronome, mechanical or electronic (such as convenience of size and use, reasonable cost, and precision of operation). As noted above, however, previous metronomes have avoided precisely pitched output, since randomly pitched rhythmic pulses may clash with the pitches indicated by the musical exercise being practiced. In the case of the harmonic metronome, pitches are not random. They are pre-programmed to correspond both harmonically and rhythmically with the scale or etude being practiced.

This possibility has not been recognized in prior inventions. Its realization was practically impossible until recent developments in digital technologies. Now, this possibility is realized and achieved with the harmonic metronome. It alone has the advantage of producing, with absolute rhythmic precision, the various sequences of pitches or musical exercises commonly employed in education and practice. In other words, it enables metronomic production of the conventional scales or modes, arpeggios, chords, and etudes or exercises.

The student and accomplished musician alike, may now practice these common exercises with the aid of the harmonic metronome, which produces the same musical patterns electronically with metronomic rhythm and pitch. The entire purpose of the harmonic metronome, in other words, is to combine the functions of the traditional metronome with the new ability to regulate and control pitch metronomically, to adapt this function for use in conventional practice routines, and to do this simultaneously in the same unique instrument.

Until now, musicians practicing with conventional metronomes may be completely unaware that, although their rhythmic coordination is precise, their pitch is consistently sharp or flat. This realization normally is made during a lesson with a teacher or while playing with other musicians. The harmonic metronome makes this belated correction unnecessary. Now the musician corrects the problem in privacy during practice.

In addition, another primary goal of the harmonic metronome is to relieve the tedium of practice that occurs with the traditional metronome. One session with the harmonic metronome will convince any musician of this advantage. With it, the metronome has been transformed from a necessary burden to a thoroughly pleasurable experience.

Further objects and advantages of my invention will become apparent from a consideration of the drawings and ensuing description.

DRAWING FIGURES

In the drawings, closely related figures have the same number but different alphabetic suffixes.

REFERENCE NUMERALS IN DRAWINGS

Reference Numerals in Drawings

Figures 1A, 1B, 1C:
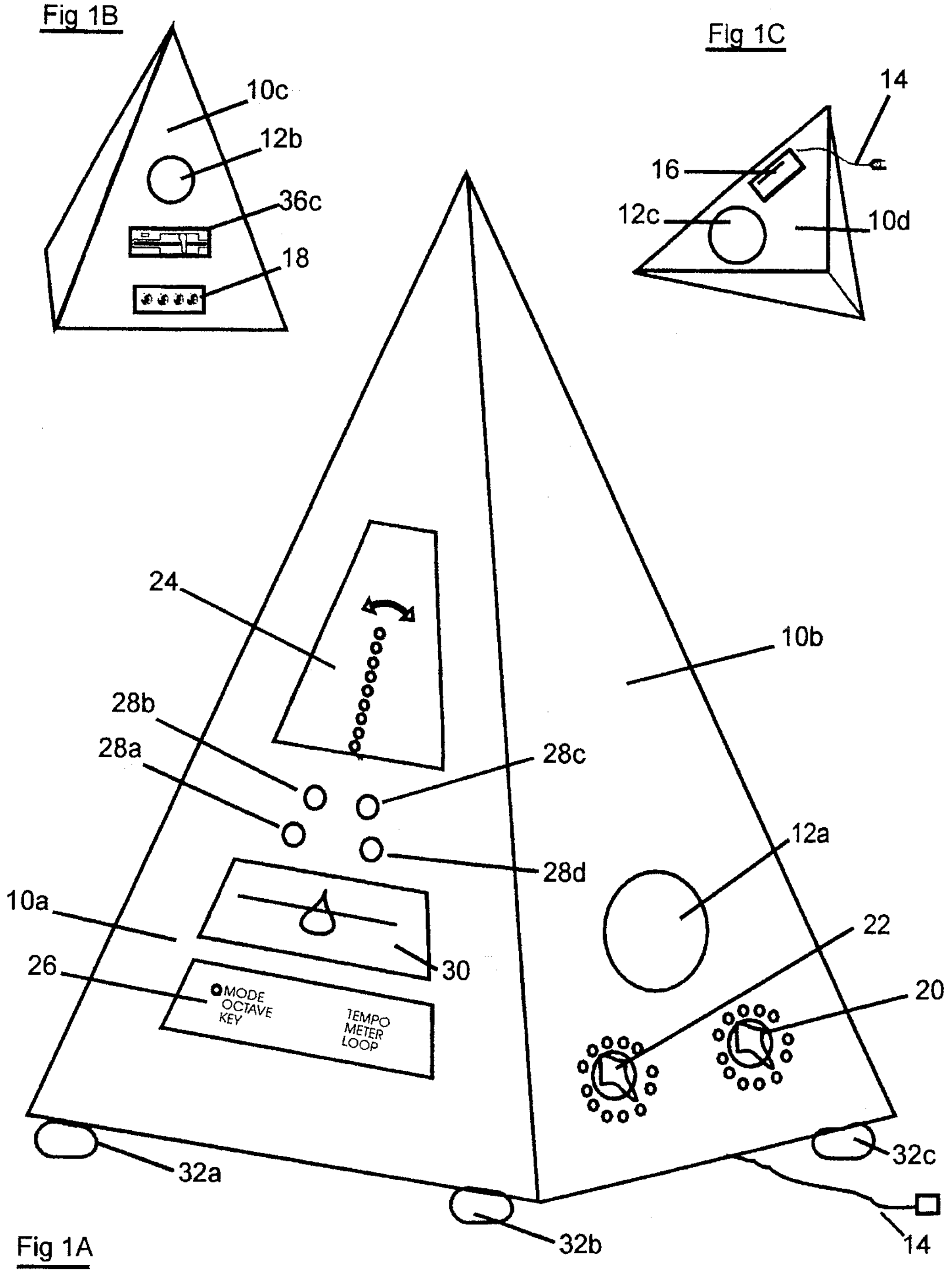
FIGS. 1A to 1C show various perspective views of one preferred embodiment of a harmonic metronome in accordance with my invention.

| | | | |
|---|---|---|---|
| 10a | flank A | 28c | Play/Stop button |
| 10b | flank B | 28d | power switch |
| 10c | flank C | 30 | data slider |
| 10d | base | 32a | foot |
| 12a | first speaker | 32b | foot |
| 12b | second speaker | 32c | foot |
| 12c | woofer speaker | 34 | CPU microprocessor |
| 14 | power cord | 36a | RAM memory |
| 16 | battery compartment | 36b | ROM memory |
| 18 | audio outputs | 36c | floppy-disc drive |
| 20 | volume | 38 | input interface |

-continued

Reference Numerals in Drawings

| | | | |
|---|---|---|---|
| 22 | balance | 40 | output interface |
| 24 | swinging optical indicator | 42 | digital signal processor |
| 26 | liquid crystal display screen | 44a | power supply |
| | | 44b | RAM battery backup |
| 28a | Select button | 46 | timer |
| 28b | Enter button | | |

DESCRIPTION—FIGS. 1A–1C

FIGS. 1A–1C shows a perspective view of a preferred embodiment of a harmonic metronome in accordance with the invention. Here, the basic pyramidal form is compatible with the traditional shape established by Maelzel for his original metronome in the early nineteenth century. With the harmonic metronome, however, instead of the traditional four-sided form, a three-sided pyramid hints at its revolutionary character.

The harmonic metronome is encased in black plastic, or any other suitably durable and attractive material. Two standard audio speakers **12*a* and 12*b* are installed on flank 10*b* and flank 10*c* respectively. A woofer speaker 12*c* is built into a base 10*d***. These audio speakers reproduce the musical output of the harmonic metronome in high-fidelity sound.

A power cord with a plug 14, and a battery compartment 16 containing batteries, both mounted on base **10*d***, provide sources of power.

On flank **10*c*, digital and analog output jacks 18** provide audio outputs to external amplifiers and speakers, headphones, recording machinery, mixers, tactile stimulators, etc., (not shown).

On flank **10*b*, a volume control 20 sets the amplitude of the harmonic metronome's audio output; and a balance control 22** sets the overall balance between the left and right segments of the stereo signal, thereby isolating or blending the lower or higher pitches in the stereo audio output.

The harmonic metronome's other user controls and a rhythmic optical display appear on the front panel, flank **10*a*. The latter consists of a light display to create a pendulum-like, swinging optical indicator 24 to provide a visual representation for the rhythmic segment of the output. A liquid crystal display (LCD) screen 26 displays control and programming information during the harmonic metronome's operation. Finally, four control buttons, (i.e. a Select button 28*a*, an Enter button 28*b*, a Play/Stop button 28*c*, and a power switch 28*d*), and a mechanical slider 30 permit user selection of various performance options as they appear on LCD screen 26**. In this way, they implement user control over the performance variables that characterize the musical output of the harmonic metronome, such as tempo, key, and meter.

The pyramid rests on three feet **32*a* 32*b* 32*c***. The harmonic metronome weighs between two and three pounds, and stands approximately eight inches high, and 5 inches wide.

OPERATION—FIG. 2

Figure 2:
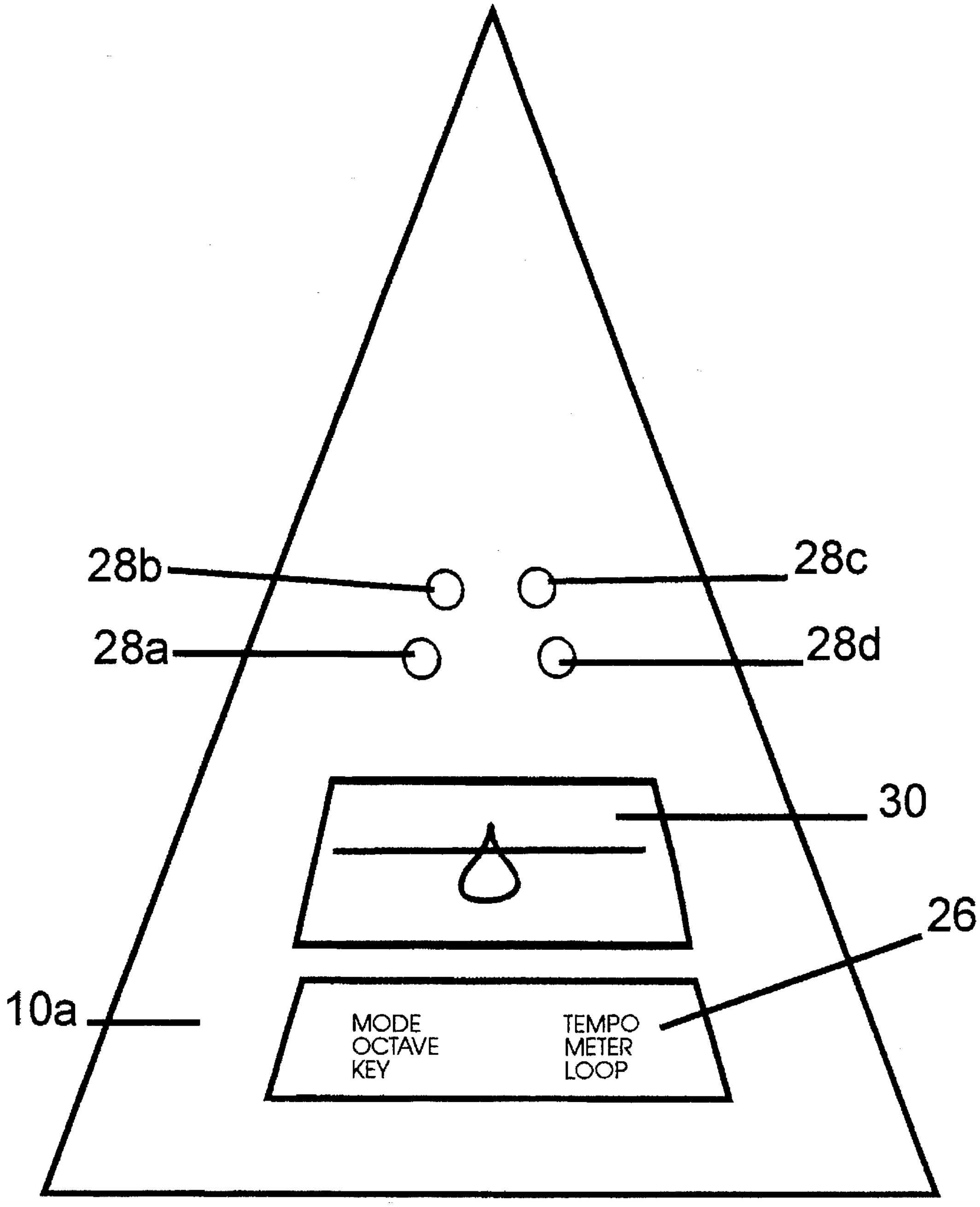
FIG. 2 shows a user control panel in the harmonic metronome of FIGS. 1A to 1C.

FIG. 2 shows flank **10*a*** of the harmonic metronome pyramid, with user controls and optical displays.

The control panel consists of four buttons (Select **28*a*, Enter 28*b*, Play/Stop 28*c*, and power switch 28*d*), and mechanical data slider 30**.

When the user first pushes power switch 28*d*, the harmonic metronome displays the beginning of the MODE page on LCD display 26. (A "page" refers to a list or menu of options that are displayed on LCD display 26 for selection by the user.)

The MODE page allows the user to control the first of the performance variables in the musical output of the harmonic metronome. This page contains a list of possible musical exercises (those which the harmonic metronome has been programmed to play). Preferably the MODE page displays the following options:

Major Scale, Major Arpeggio

Lydian Scale, Lydian Arpeggio

Lydian Augmented Scale, Lydian Augmented Arpeggio

Augmented Scale, Augmented Arpeggio

Harmonic Major Scale, Harmonic Major Arpeggio

Major Pentatonic Scale, Major Pentatonic Arpeggio

Diminished Scale, Diminished Arpeggio

Dorian Scale, Dorian Arpeggio

Natural Minor Scale, Natural Minor Arpeggio

Harmonic Minor Scale, Harmonic Minor Arpeggio

Pre-programmed sequence A

Pre-programmed sequence B, etc.

User sequence A

User sequence B, etc.

Major Chords (for vocal practice)

Minor Chords (for vocal practice), etc.

Pitchless beat.

When the MODE page first appears, the first item in the list is highlighted. Using Select button 28*a* for scrolling the highlight through the options (each press of Select button 28*a* advances the highlight in single-unit increments), or the Data Slider 30 for scrolling more quickly, the user selects the desired option from the list. If the user then pushes Play/Stop button 28*c*, the corresponding musical exercise is played by the harmonic metronome. It uses tempo, octave, key, and loop values (defined below) according to factory pre-programmed default settings.

For example, if the user pushes power switch 28*d*, pushes Select button 28*a* twice (thus highlighting the third or Lydian option on the MODE page), and then pushes Play/Stop button 28*c*, the harmonic metronome produces an audio and visual equivalent of a Lydian scale, in three octaves, in the key of C, at a tempo of 90 beats per minute, in a duple 4/8 meter (in accordance with default values for octave range, key, tempo, and meter as described below). Pressing Play/Stop button 28*c* also activates a timer 46 (see FIG. 3 ), which times the performance of the harmonic metronome and displays the elapsed time in minutes and seconds on LCD display 26.

If, however, the user pushes Enter button 28*b*, the OCTAVE page appears on LCD display 26. This page displays the following list of options:

1 octave 2 octaves 3 octaves 4 octaves

When the OCTAVE page appears, the first item in the list is highlighted. Again, using Select Button 28*a* or Data Slider 30, the user selects the desired option from the list.

If the user now pushes Play/Stop button 28*c*, the chosen musical exercise is produced by the harmonic metronome. This time the harmonic metronome uses tempo, key, and loop values according to factory pre-programmed default values, while implementing the above-mentioned user choices on the MODE and OCTAVE page. For example, if the user has chosen the two octave option, the harmonic metronome produces a Lydian scale, in two octaves, in the key of C, at a tempo of 90 beats per minute, in a duple meter (and the elapsed time is displayed on LCD display 26.)

If, instead, the user once again pushes Enter button 28*b*, the KEY page appears on LCD display 26. Using the above-described method, the user may select a different tonal center or key from the KEY page, which displays the following list of options:

C

C-sharp

D

D-sharp

E, etc. through

B

If the user now pushes Enter button 28*b*, the following TEMPO page appears on LCD display 26:

20 bpm (beats per minute)

25 bpm 30 bpm 35 bpm 40 bpm 45 bpm 50 bpm, etc. through 240 bpm

In the above-described manner, pressing Select Button 28*a* or Data Slider 30, the user makes a selection from the TEMPO page. After pressing Enter button 28*b*, the following METER page appears on LCD display 26.

2/2, 2/4, 2/8

3/2, 3/4, 3/8

4/2, 4/4, 4/8

6/4, 6/8, 9/8

Finally, after selecting an option on the METER page, the user presses Enter button 28*b*, and the following LOOP page appears on LCD display 26:

repeat repeat two times repeat three times, etc. through repeat ten times repeat+five repeat+ten The LOOP page allows the user to program a schedule of repetitions for the previously selected exercise. In other words, after the user selects, for example, the Lydian mode, in four octaves, in the key of B-flat, at a tempo of 70 beats per minute, the user may choose the repeat option on the LOOP page. Then, on pressing Play/Stop button 28*c*, the harmonic metronome plays the Lydian mode, as specified by the user-chosen key, octave and tempo values, for an indefinite number of repetitions until the user presses Play/Stop button 28*c* or power switch 28*d*.

If, in another example, the repeat+five option is selected by the user on the LOOP page, the harmonic metronome produces the Lydian mode as specified by the preset octave, key, tempo, and meter values. In addition, the tempo value would be increased by 5 beats per minute on each repetition, i.e., from, say, 70 beats per minute (or whatever value has been chosen on the Tempo page) through 240 beats per minute (the upper limit in this embodiment of the harmonic metronome).

Alternatively, pre-programmed exercises may be employed. Pre-programmed musical exercises are of different kinds. One, for example, presents all of the various modal options on the MODE page in succession one after the other. Another, more abridged exercise presents only the major and minor modes in succession. Another presents a common etude composed, for example, by Pagannini.

In this way, the musician (or the teacher for the student), can program entire courses of study and practice that are tailored to the specific demands of time and ability unique to the individual.

It should be noted that when the user chooses the pitchless beat option on the MODE page, the harmonic metronome outputs a traditional metronomic signal, indicating the rhythmic and metric pulse exclusively, with sounds of indeterminate pitch. At all times, of course, swinging optical indicator 24 on flank 10*a* of the harmonic metronome gives a visual display of the rhythmic and metric pulse.

OPERATION—FIG. 3

Figure 3:
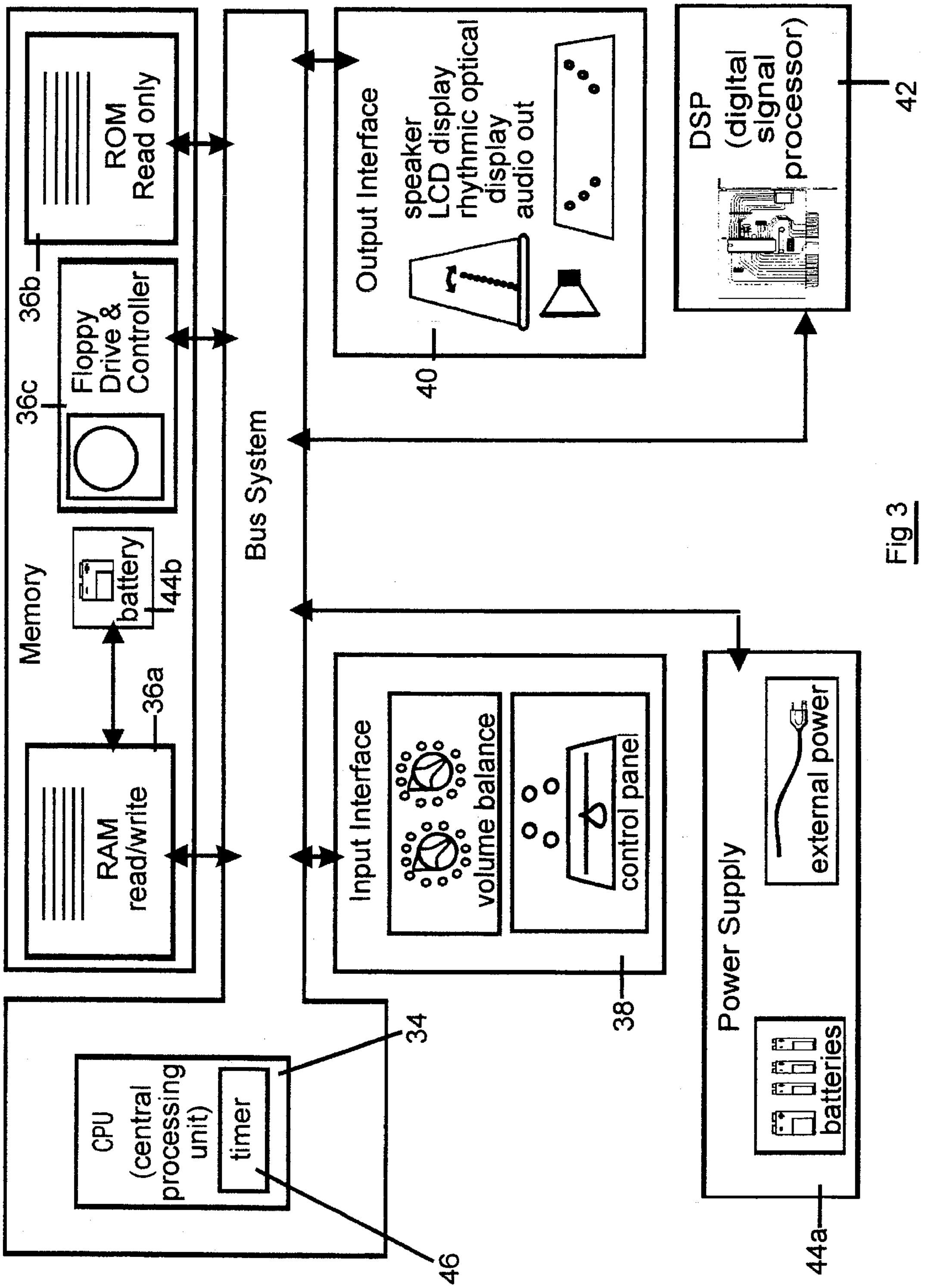
FIG. 3 shows an operational flow-chart of the electronic components in the harmonic metronome of FIGS. 1A to 1C.

FIG. 3 displays the operation of the harmonic metronome through a flow-chart arrangement of its electronic components.

Power switch button 28*d* enables the harmonic metronome, by passing the appropriate electrical current from a power supply 44*a* to all of the other electronic components.

Basic to the harmonic metronome, a Central Processing Unit CPU 34 preferably is a suitable microprocessor readily available on the market. Its circuitry includes timer 46, which, as noted above, clocks the time elapsed in each performance of the harmonic metronome, and displays the result in minutes and seconds on LCD display 26.

On power-up of the harmonic metronome, CPU 34 reads the MODE page data file out of a Read-Only-Memory ROM 36*b*, and displays the beginning of its list of options (with the first item highlighted) on LCD display screen 26.

Next, CPU 34 reads a default data file, containing default MODE, OCTAVE, KEY, TEMPO, METER, and LOOP values, again out of ROM 36*b*, and loads it into a Random-Access Memory RAM 36*a*. This data (hereafter referred to as the default play file) is written in one of the standard MIDI (Musical Instrument Digital Interface) file formats, or in any other similar file type. It contains values corresponding to a specific set of selections from the range of options that are listed for the user on all of the various display pages (i.e., the MODE, OCTAVE, KEY, TEMPO, METER and LOOP pages).

If the user pushes Play/Stop button 28*c* immediately after power-up, CPU 34 executes a series of pre-programmed commands. First, it reads the above-mentioned default values (the default play file) that it previously stored in RAM 36*a*. It then reads, out of ROM 36*b*, various piano samples according to the requirements of these default values. ("Samples" are recordings of specific piano sounds written digitally in one of the standard soundwave-type files).

CPU 34 sends these digital piano samples to a digital signal process DSP 42, which is the sound engine of the harmonic metronome. DSP 42 processes the piano samples, again according to the default values in the default play file. Then, it converts the resultant digital data into an analog signal, amplifies it, and conveys it to audio speakers 12*a*, 12*b*, and 12*c*. This signal and its digital-audio equivalents am simultaneously conveyed without amplification to audio outputs 18; and the exclusively rhythmic information in the signal is output to swinging optical indicator 24. CPU 34 also activates timer 46, which clocks the performance of the play file and displays the result in minutes and seconds on LCD 26.

In this way, the harmonic metronome produces a typical musical exercise, preprogrammed at the factory. In other words, after pushing Play/Stop button 28*c* immediately after power up, one will hear (with one possible setting of the default values) a major scale, in three octaves, in the key of C, at a tempo of 90 beats per minute, in a duple 4/8 meter. This exercise will be repeated, for an indefinite number of repetitions, until the user again pushes Play/Stop button 28*c* or Power Off button 28*d*.

If after power-up the user pushes Data Slider 30 and/or Select Button 28*a*, CPU 34 highlights the corresponding items on the MODE page on LCD screen 26. If the user highlights the Melodic Minor entry in this way and presses Enter button 28*b*, CPU 34 writes a corresponding change into the default play file, previously stored (see above) in RAM 36*a*. It then reads the OCTAVE page data out of ROM 36*b*, and displays the OCTAVE page data on LCD display 26, with the first entry once again highlighted as described above.

If the user now pushes Play/Stop button 28*c*, the harmonic metronome plays (and shows on the swinging optical indicator, etc.) the newly modified play file: a melodic minor scale, in three octaves, in the key of C, at a tempo of 90 beats per minute, in a duple 4/8 meter, for an indefinite number of repetitions.

If the user pushes Enter button 28*b* instead, CPU 34 reads the OCTAVE page out of ROM 36*b*, and displays its options on LCD display 26. If the user now pushes Data Slider 30 and/or Select button 28*a*, the corresponding items on the OCTAVE page are highlighted. If the user highlights the Four Octave item on the list, and then presses Enter button 28*b*, CPU 34 writes a corresponding change into the default play file in RAM 36*a*, reads the KEY page data out of ROM 36*b*, and displays it on LCD screen 26.

The user may now push Play/Stop button 28*c*, in which case harmonic metronome will play the newly selected musical exercise. Or, the user may use Select button 28*a* and data slider 30 to scroll through the values on the KEY page, selecting the desired option with Enter button 28*b*. In like manner, the user may move through the successive pages to make the desired selections from the various lists of options. And, according to these selections, CPU 34 alters the default play file stored in RAM 36*a*.

The resulting default file may be considerably altered from the factory programmed version that was originally read out of ROM 36*b*. When the harmonic metronome is turned off, this new file is saved by virtue of a small battery backup 44*b* which keeps RAM 36*a* constantly powered. When the harmonic metronome is next powered on, however, CPU 34 writes over any previously edited default file, with the values of the original default file that it has retrieved out of ROM 36*b*.

The user, however, may wish to save a given set of options, To do so, the user begins the operation of the harmonic metronome after power-up by highlighting one of the so-called "available" entries on the MODE page list. An "available" entry is simply the name (such as User A or User B) under which CPU 34 stores a specific play file other than the default play file in RAM 36*a*. This play file, like the default play file, consists of a given set of play options, selected from the various pages (MODE, OCTAVE, etc.) as described above. In this case, however, the play options are not pre-programmed. They correspond to specific values as they are selected by the user.

When one of the "available" options is selected on the MODE page, and the user pushes Enter button 28*b*, CPU 34 looks for the corresponding play file under the "available" name in RAM 36*a*.

If CPU 34 does find the designated "available" file in RAM 36*a*, and the user then presses Play/Stop button 28*d*, the harmonic metronome plays the musical exercise as specified by the values contained in that particular play file.

If CPU 34 does not find a file under the designated "available" name, it creates such a file in RAM 36*a*. When the user pressed Enter button 28*c* after highlighting one of the "available" entries, CPU 34 also displayed the MODE page on LCD screen 26. Operating control buttons 28*b*, 28*c*, and data slider 30, the user now selects an option. CPU 34 writes that selection, and any subsequent user-selected options (from any of the various pages—MODE, OCTAVE, etc.) to a file stored under the newly-created "available" file name. This play file is retained after power-off by RAM battery 44*b*, and is available to the user on the next power-up by selecting the proper "available" entry from the MODE page list.

The operation of the harmonic metronome is correspondingly simple and direct. Musicians of all kinds may program it to meet their individual musical needs at any given moment.

SUMMARY, RAMIFICATIONS, AND SCOPE

Thus, the reader will see that the harmonic metronome provides a unique and unprecedented device for use in musical practice and education. This device produces metronomic performances of standard musical exercises, realized with full reference to the required rhythms. Unlike all other metronomes, the required pitches of those specific exercises are also produced. Exercises are played in any key, tempo, and meter, and they are repeated as desired by the user.

While my descriptions above contain many specificities, these should not be construed as limitations on the scope of the invention, but rather as an exemplification of one preferred embodiment thereof. Many other variations are possible. The size, shape, color, construction materials, etc. may be varied according to many tastes and needs.

The user controls may include devices which provide for input through voice recognition, touch sensitive display screens, remote control, etc. The power source may include solar power cells.

Other variations expand the range of some of the options on the various display pages (MODE, OCTAVE, etc.) of the harmonic metronome. This is done, not by altering the function of the harmonic metronome, but by expanding, for example, its memory capacity.

One embodiment of the invention, in this way, includes the operation of a floppy-disc drive and interface 36*c*, to be used in conjunction with RAM 36*a*. This addition makes it possible for the user to choose from an unlimited number of pre-programmed sequences. (Instead of a floppy disc drive, all kinds of tape drives, CD-ROM drives, and external hard drives, being standard memory devices, may be employed for the same purpose.)

As stated, CPU 34 reads either a default play file out of ROM 36*b*, or one of the "available" play files previously stored in RAM 36*a*. Therefore, the harmonic metronome performs from a finite number of sequences that may be saved in its memories 36*a* and 36*b*.

It is not possible to store in this way all of the possible sequences a musician might desire to play in the course of practice. To begin with, a musician's choice depends on what instrument is being practiced. Further, it depends on the musician's level of competence. External memory options provide the solution to this limitation. In other words, the harmonic metronome is rendered capable of reading and playing any number of musical exercises with the addition of floppy-disc drive 36*c*. In this way, it may read play files out of ROM 36*b*, RAM 36*a*, or floppy-disc drive 36*c*.

Various embodiments of the harmonic metronome may also span a range of monophonic and polyphonic capabilities. In other words, the actual number of discreet voices or instruments produced will depend on the particular kind of DSP 42 employed, selecting from a variety of available possibilities widely known in the art. Thus, one embodiment of the harmonic metronome provides only the principal melodic voice of the musical exercise. Another embodiment provides a secondary bass line in addition to the main voice of the exercise. Another embodiment provides a full texture of four-voice harmonic accompaniment along with the principal melodic voice.

Likewise, alternative embodiments of the harmonic metronome provide a choice of instrumental sounds. By storing harp samples in ROM 36*b*, for example, instead of the piano samples, the harmonic metronome will produce sounds of a completely different timbral quality. One embodiment of the harmonic metronome, in fact, is capable of sounding a full orchestral compliment of instruments.

On the other hand, a very simple embodiment of the harmonic metronome may dispense with ROM 36*b* entirely, using an analog signal processor instead of DSP 42. For example the pitches may be produced by a simple square wave oscillator, to produce a kind of brass-like instrument.

Moreover, it should not be assumed that the harmonic metronome is available only in the form of a dedicated microprocessor, as described above. The harmonic metronome represents a new and expanded method of producing a metronomic accompaniment for musical practice and study. It is a method that is defined by the way it moves the realm of the metronome into the area of pitch, as well as rhythm.

Therefore, one embodiment of the harmonic metronome may simply provide an audio recording of a sequence of musical exercises as performed by the mechanical harmonic metronome described above.

It is also possible to use a multimedia computer platform consisting of data processors, memory devices, keyboards, monitors, sound cards, audio speakers, and audio outputs. In this way, a plurality of musical exercises may be stored, retrieved, and selected for performance according to specific key, tempo, meter, and repeat values as desired by the user.

Accordingly, the scope of the invention should be determined not by the embodiment illustrated, but by the appended claims and their legal equivalents.

I claim:

1. A harmonic metronome device for producing musical exercises for study and practice comprising:

(a) a powering means for providing electrical energy, and (b) a microprocessing means for executing pre-programmed internal commands in coordination with external user-input commands, and (c) a user-interfacing means for selecting said external user-input commands from a plurality of pre-programmed lists of options that represent various musical exercises and their performance variables, including mode, tempo, meter, and key, and for altering the volume, and stereo balance of said musical exercises, and (d) a digital memory means for storing and retrieving said commands and a plurality of digitally recorded instrumental samples in an electronic memory, and (e) a signal processing means selected from the group consisting of analog and digital signal processors, for reproducing a plurality of pre-programmed musical exercises consisting of a plurality of sequences of precisely coordinated pitches and rhythms, and (f) a means for providing a humanly-sensible output of said signal processor selected from the group consisting of audio speakers, headphones, analog outputs, digital outputs, tactile stimulators, and optical outputs, whereby musicians can measure and regulate the musical production of precise pitch and rhythm.

2. The harmonic metronome of claim 1 wherein said optical outputs for displaying the purely rhythmic component of said musical exercises consists of a swinging pendulum image.

3. The harmonic metronome of claim 1 wherein said microprocessor contains a timer for clocking the performance of said musical exercises.

4. The harmonic metronome of claim 1, wherein said digital memory means contains interfacing for a floppy-disc, for loading a plurality of additional musical exercises into said electronic memory.

5. The harmonic metronome of claim 1 wherein said user-interfacing means contain a means for enabling a user to choose from a plurality of instrumental sounds.

6. The harmonic metronome of claim 1 wherein said user-interfacing means are selected from the group consisting of voice recognition interfaces, touch sensitive display screens, and a remote control.

7. The harmonic metronome of claim 1 wherein said electric power is produced by solar power cells.

8. A method for producing a plurality of musical exercises, including scales, arpeggios, and etudes, consisting of sequences of perfectly timed and perfectly tuned musical pitches, comprising the steps of (a) creating, storing, and retrieving said musical exercises in the form of digital computer files, and (b) selecting various playback performance parameters for said files, including key, tempo, meter, instrumental samples, and schedule of repetitions, and (c) making said musical exercises humanly sensible.

* * * * *